United States Patent
Ortega

(10) Patent No.: US 6,584,648 B2
(45) Date of Patent: Jul. 1, 2003

(54) FAUCET HANDLE THREADED END CAP WITH HEX DRIVE

(75) Inventor: Indalecio Ortega, Lakewood, CA (US)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 09/966,286

(22) Filed: Sep. 28, 2001

(65) Prior Publication Data

US 2003/0061685 A1 Apr. 3, 2003

(51) Int. Cl.⁷ .............................................. A45C 13/22
(52) U.S. Cl. ...................... 16/436; 16/111.1; 16/422; 137/378
(58) Field of Search .................. 16/436, 111.1, 16/406, 114 R, 422, DIG. 110 R, 111 R, DIG. 24, 110.1; 137/378, 377; 411/393, 403, 404, 110

(56) References Cited

U.S. PATENT DOCUMENTS

| | | | |
|---|---|---|---|
| 1,553,684 A | | 9/1925 | Gerberich |
| 1,701,776 A | * | 2/1929 | Hinman ........................ 16/414 |
| 3,301,580 A | | 1/1967 | Greitzer |
| 3,965,528 A | * | 6/1976 | Kissler ....................... 16/110.1 |
| 4,829,632 A | | 5/1989 | Freier et al. |
| 4,887,642 A | * | 12/1989 | Bernat .................... 137/625.17 |
| 4,949,964 A | * | 8/1990 | Jolly ........................... 403/104 |
| 4,961,443 A | * | 10/1990 | Buccicone et al. ..... 137/315.15 |
| 5,031,657 A | * | 7/1991 | Stairs .......................... 137/327 |
| 5,093,959 A | * | 3/1992 | McTargett et al. ............ 16/422 |
| 5,257,645 A | * | 11/1993 | Scully et al. ................ 137/359 |
| 5,852,848 A | * | 12/1998 | Spurgeon ................ 137/315.01 |
| 5,933,916 A | * | 8/1999 | Loschelder ................ 16/110.1 |
| 5,983,747 A | | 11/1999 | Chen |
| 6,244,130 B1 | * | 6/2001 | Shung .......................... 16/441 |
| 6,438,771 B1 | * | 8/2002 | Donath et al. ............... 137/359 |

* cited by examiner

Primary Examiner—Gary Estremsky
Assistant Examiner—Mark Williams
(74) Attorney, Agent, or Firm—Richard J. Veltman; John D. Del Ponti

(57) ABSTRACT

A faucet handle includes a hub, handle body and end cap. The handle body includes a first end with external threads and a second end with internal threads and a central bore extending between the first and second ends. The end cap includes a shank with a bore configured to receive a driver, such as a hex wrench, and threads to engage the internal threads of the second end. In use, a consumer inserts a driver through the central bore to engage the bore of the end cap and screw the end cap into the second end of the handle body. The handle body is then screwed into the hub.

5 Claims, 1 Drawing Sheet

FAUCET HANDLE THREADED END CAP WITH HEX DRIVE

The present invention relates to faucet handles generally and, in particular to faucet handles with a decorative cap that threads into the end of the handle.

BACKGROUND OF THE INVENTION

Conventional faucet handles typically include a hub and a hand grip, as illustrated in U.S. Pat. No. 1,553,684 to Gerherich and U.S. Pat. No. 5,933,916 to Loschelder. Preferably, the handgrip is removable from the hub to provide the consumer with the option of changing the handgrip to suit personal taste. As illustrated in Loschelder, a removable handgrip is attached to the hub by a screw that extends through the handgrip, with the screw including a decorative end cap. Unfortunately, in order to torque Loschelder's screw, the decorative end cap must be grasped by a wrench or pair of pliers that can scratch the surface finish and mar the appearance of the faucet handle. Flats could be included on the end cap, but aesthetics would be sacrificed.

SUMMARY OF THE INVENTION

The present invention provides a faucet handle that includes a hub, handle body and end cap. The handle body includes a first end with external threads, a second end with internal threads, and a central bore extending between the first and second ends. The end cap includes a shank with a bore configured to receive a driver, such as a hex wrench, and threads to engage the internal threads of the second end.

A method of assembling a faucet handle includes inserting a driver, such as a hex wrench, through the central bore to engage the end cap and drive the end cap into engagement with the handle body. The driver is removed and the handle body is installed on the hub.

These and other objects, features and advantages of the present invention will become apparent from the following description when viewed in accordance with the accompanying drawings and appended claims.

DETAILED DESCRIPTION OF THE DRAWINGS

Figure 1:
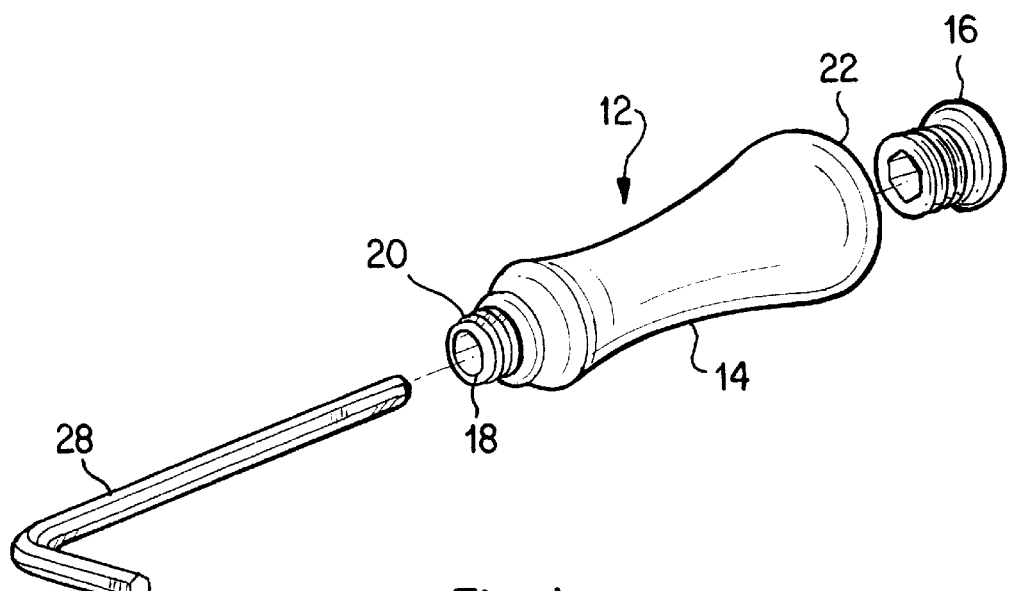
FIG. 1 is an exploded perspective view of a faucet handle grip and decorative end cap according to the present invention.
Figure 2:
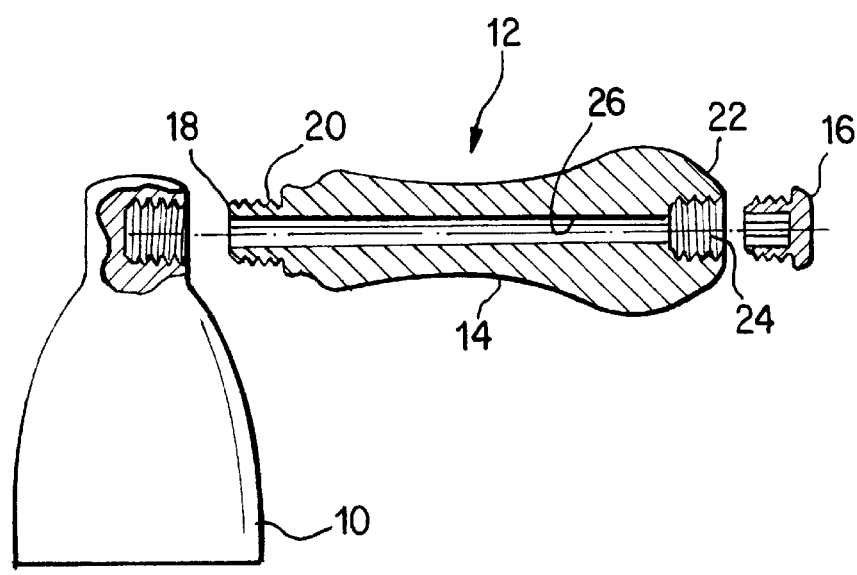
FIG. 2 is a partial section view taken along the longitudinal axis of the handgrip and decorative end cap.

A faucet handle according to the present invention, illustrated in FIGS. 1 and 2, includes a hub 10 and a handgrip 12. The handgrip 12 includes a body 14 and an end cap 16. The body 14 has a first end 18 with external threads 20, a second end 22 with internal threads 24, and a central bore 26 extending longitudinally through therethrough. Preferably, the bore 26 is sized to allow a ⅛ inch hex wrench 28 to rotate freely therein.

The end cap 16 includes a shank 30 with external threads 32 that are configured to engage the internal threads 24 in the handgrip 12. The end cap 16 further includes a central longitudinal bore 34 extending partially into the end cap 16. The bore 34 has a hexagonal cross section that is configured to engage the hex wrench 28.

In use, a faucet can be shipped with a single hub 10 and decorative end cap 16, but a plurality of handgrips 12. The consumer chooses a hand grip style to suit his/her personal taste and screws the end cap 16 into the body 14. The hex wrench 28 can be provided to allow the consumer to tighten the end cap 16 to prevent it from unscrewing. The handgrip 12 can then be screwed into the hub 10 to complete the faucet handle.

Advantageously, the present invention allows a consumer to tightly install an end cap to a handgrip without marring the surface of the body or the end cap. At the same time, the hand grip and end cap are conducive to machine assembly, such that a particular faucet handle can be assembled with a faucet for sale, yet be easily removed and replaced by a consumer without marring the surface of the decorative end cap or the hand grip.

While the present invention has been described with reference to particular preferred embodiments, one skilled in the art will readily recognize from the foregoing discussion and accompanying drawings and claims, that changes, modifications and variations can be made in the present invention without departing from the spirit and scope thereof as defined in the following claims.

What is claimed is:

1. A faucet handle comprising:
    a hub having a threaded bore;
    a handle body having a first end with external threads and a second end with internal threads, the first end being configured to engage the threaded bore; and
    an end cap configured to engage the second end of the handle body, the end cap including a shank having a central longitudinal bore therein.

2. A faucet handle comprising:
    a hub having a threaded bore;
    a handle body having a longitudinal axis, a central bore first extending longitudinally through the body, and including means for engaging the hub; and
    an end cap having means for engaging the handle body, the end cap including a central bore and external threads.

3. A faucet handle comprising:
    a handle body having a central longitudinal bore;
    a hub having a bore for receiving the handle body; and
    an end cap having a shank for engaging the handle body, the shank including means for engaging a driver.

4. The faucet handle of claim 3 wherein the means for engaging includes a bore having a hexagonal cross section and the driver includes a hexagonal wrench.

5. A method of assembling a faucet handle comprising the steps of:
    providing a hub;
    providing a handle body with a central bore, a first end configured to engage the hub, and a second end;
    providing an end cap with a shank configured to engage the second end and including means for engaging a driver;
    inserting a driver through the handle body central bore, engaging the means for engaging a driver, and using the driver to tighten the end cap on the handle body; and
    engaging the first end of the handle body with the hub to retain the handle body on the hub.

* * * * *